United States Patent
Yamada et al.

(10) Patent No.: US 11,530,846 B2
(45) Date of Patent: *Dec. 20, 2022

(54) COLD HEAD, SUPERCONDUCTING MAGNET, EXAMINATION APPARATUS, AND CRYOPUMP

(71) Applicants: KABUSHIKI KAISHA TOSHIBA, Tokyo (JP); TOSHIBA MATERIALS. CO., LTD., Yokohama (JP)

(72) Inventors: Katsuhiko Yamada, Kanagawa (JP); Keiichi Fuse, Kanagawa (JP)

(73) Assignees: KABUSHIKI KAISHA TOSHIBA, Tokyo (JP); TOSHIBA MATERIALS CO., LTD., Yokohama (JP)

( * ) Notice: Subject to any disclaimer, the term of this patent is extended or adjusted under 35 U.S.C. 154(b) by 56 days.

This patent is subject to a terminal disclaimer.

(21) Appl. No.: 16/928,483

(22) Filed: Jul. 14, 2020

(65) Prior Publication Data
US 2020/0348052 A1 Nov. 5, 2020

Related U.S. Application Data

(63) Continuation of application No. 14/688,475, filed on Apr. 16, 2015, now Pat. No. 10,753,652, which is a (Continued)

(30) Foreign Application Priority Data

Oct. 22, 2012 (JP) .................................. 2012-232936

(51) Int. Cl.
F25B 9/14 (2006.01)
F25D 25/00 (2006.01)
(Continued)

(52) U.S. Cl.
CPC .................. *F25B 9/14* (2013.01); *C09K 5/14* (2013.01); *F25D 25/00* (2013.01); *F28D 17/02* (2013.01);
(Continued)

(58) Field of Classification Search
CPC .................. F25B 9/14; F25B 2309/003; F25B 2309/1415; F25B 2309/1416; F28D 17/02; C09K 5/14
See application file for complete search history.

(56) References Cited

U.S. PATENT DOCUMENTS 5,186,765 A 2/1993 Arai et al.
5,345,770 A 9/1994 Inaguchi
(Continued)

FOREIGN PATENT DOCUMENTS

CN 1160442 A 9/1997
EP 0411591 A2 2/1991
(Continued)

OTHER PUBLICATIONS

Japanese Office Action issued in Japanese Application No. 2014-543147 dated Aug. 29, 2017.

*Primary Examiner* — Nael N Babaa
(74) *Attorney, Agent, or Firm* — Foley & Lardner LLP

(57) ABSTRACT

A reduction in a permeability of refrigerant gas is suppressed while increasing a filling factor of regenerator material particles with respect to a stage of a cold head. A cold head includes a stage including regenerator material particle groups, and a metal mesh material partitioning the regenerator material particle groups. The metal mesh material has quadrangular mesh holes each having a length of a long side of $\frac{1}{10}$ or more and $\frac{1}{2}$ or less of each of average particle sizes of the regenerator material particle groups.

14 Claims, 4 Drawing Sheets

Related U.S. Application Data continuation of application No. PCT/JP2013/006243, filed on Oct. 22, 2013.

(51) Int. Cl.
  *C09K 5/14* (2006.01)
  *F28D 17/02* (2006.01)

(52) U.S. Cl.
  CPC . *F25B 2309/003* (2013.01); *F25B 2309/1415* (2013.01); *F25B 2309/1416* (2013.01)

(56) References Cited

U.S. PATENT DOCUMENTS

| | | |
|---|---|---|
| 5,449,416 A | 9/1995 | Arai et al. |
| 5,593,517 A | 1/1997 | Saito |
| 5,974,807 A | 11/1999 | Gao |
| 6,042,657 A | 3/2000 | Okamura et al. |
| 6,197,127 B1 | 3/2001 | Okamura et al. |
| 10,753,652 B2 * | 8/2020 | Yamada ................. F25D 25/00 |
| 2001/0025494 A1 | 10/2001 | Okamura |
| 2004/0013593 A1 | 1/2004 | Takagimi |
| 2004/0093877 A1 | 5/2004 | Wada |
| 2006/0225434 A1 | 10/2006 | Arman |
| 2008/0173026 A1* | 7/2008 | Mita ................. F25B 9/145 62/6 |
| 2011/0173995 A1 | 7/2011 | Takayama |
| 2012/0151912 A1 | 6/2012 | Yamashita |
| 2012/0157320 A1 | 6/2012 | Yamada et al. |
| 2012/0193063 A1 | 8/2012 | Yuan |
| 2012/0247143 A1 | 10/2012 | Matsubara |

FOREIGN PATENT DOCUMENTS

| | | |
|---|---|---|
| EP | 0774522 A2 | 5/1997 |
| EP | 0882938 A1 | 12/1998 |
| EP | 2472201 A1 | 7/2012 |
| JP | 3-174486 A | 7/1991 |
| JP | H03-208378 A | 9/1991 |
| JP | H08-145485 A | 6/1996 |
| JP | 2609747 B2 | 5/1997 |
| JP | 9-269156 A | 10/1997 |
| JP | 2002-286311 A | 10/2002 |
| JP | 2005-090854 A | 4/2005 |
| JP | 2006-090648 A | 4/2006 |
| JP | 3769024 B2 | 4/2006 |
| JP | 2008-096040 A | 4/2008 |
| JP | 2011-027272 A | 2/2011 |
| WO | WO-2011/024757 A1 | 3/2011 |

* cited by examiner

COLD HEAD, SUPERCONDUCTING MAGNET, EXAMINATION APPARATUS, AND CRYOPUMP

CROSS-REFERENCE TO RELATED APPLICATIONS

This application is a continuation of U.S. patent application Ser. No. 14/688,475, filed on Apr. 16, 2015, which is a continuation of prior International Application No. PCT/JP2013/006243 filed on Oct. 22, 2013, which is based upon and claims the benefit of priority from Japanese Patent Application No. 2012-232936 filed on Oct. 22, 2012; the entire contents of all of which are incorporated herein by reference.

FIELD

Embodiments described herein relate generally to a cold head, a superconducting magnet, an examination apparatus, and a cryopump.

BACKGROUND

In recent years, a superconducting technology has been remarkably developed, and various types of examination apparatus such as a Magnetic Resonance Imaging (MRI) apparatus and a Nuclear Magnetic Resonance (NMR) apparatus have been used. In order to use the superconducting technology, a cryogenic temperature of 10 K or less, and further, 4 K or less is required to be realized. In order to realize such a cryogenic temperature, a refrigerator called as a cold head is used.

There are various types of cold head such as one of Gifford-McMahon type (GM type), one of Stirling type, and one of pulse type. In any one of the types of cold head, to achieve the cryogenic temperature, a regenerator material is filled in a regenerator container called as a stage.

Depending on a design of the cold head, the stage is sometimes formed of one stage, and is sometimes divided into a plurality of stages such as two stages. Helium gas is passed through the stage, and a specific heat per volume of the regenerator material is utilized to obtain the cryogenic temperature.

One example of a cold head for obtaining the cryogenic temperature of 4K or less has a three-layer structure including a lead regenerator material, a $HoCu_2$ regenerator material, and a GOS regenerator material (gadolinium oxysulfide regenerator material) filled in a second stage (second-stage regenerator container).

The above-described cold head can obtain the cryogenic temperature by causing an adiabatic expansion of refrigerant gas such as helium gas. As described above, in the cold head for obtaining the cryogenic temperature, a plurality of types of regenerator materials are filled in layers in the stage.

When the plurality of types of regenerator materials are used, since a specific heat peak temperature of each of the materials is different, it is not possible to mix and use the regenerator materials. Accordingly, when the plurality of types of regenerator materials are used, the material layers are partitioned by a metal mesh material.

As the regenerator material, for example, a regenerator material particle group with aligned particle size in which a proportion of particle having a particle size of not less than 0.01 mm nor more than 3 mm is 90% or more, and a proportion of particle having an aspect ratio of 5 or less is 90% or more, is used.

When the metal mesh material is used to partition the plurality of types of regenerator material particle groups, a problem in which mesh holes of the metal mesh material are clogged with the regenerator material particles, has arisen. If the mesh holes are clogged with the regenerator material particles, a permeability of refrigerant gas is lowered.

In the regenerator operation using the regenerator material particles, the adiabatic expansion due to a specific heat per volume of the regenerator material particles is utilized, so that it is preferable to fill as many regenerator material particles as possible in the stage. For this reason, the regenerator material particle groups are filled so as to be closely contacted to the metal mesh material. In addition to that, the permeability of the refrigerant gas has to be secured.

DETAILED DESCRIPTION

A cold head of an embodiment includes a stage including: regenerator material particle groups; and a metal mesh material partitioning the regenerator material particle groups. The metal mesh material has quadrangular mesh holes. A length of a long side of the mesh hole is 1/10 or less and 1/2 or more of each of average particle sizes of the regenerator material particle groups.

A cold head of the present embodiment has a first stage and a second stage. As a type of the cold head, various types such as a GM type, a Stirling type, or a pulse type can be employed. In any one of the types of cold head, to achieve the cryogenic temperature of 10 K or less, and further, 5 K or less, regenerator materials are filled in the first stage and the second stage. As the regenerator material for the first stage, a copper mesh material, for example, can be used.

Figure 1:
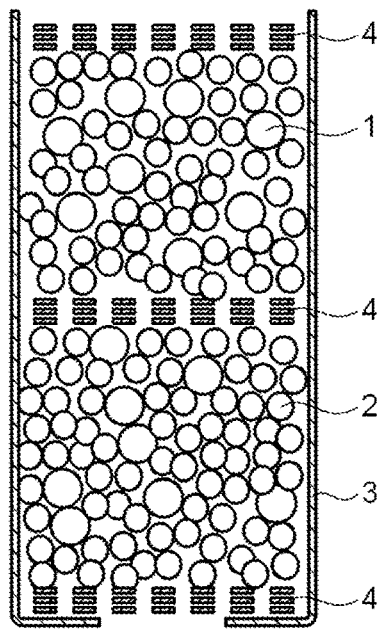
FIG. 1 is a diagram illustrating an example of structure of a second stage of a cold head of an embodiment.
Figure 2:
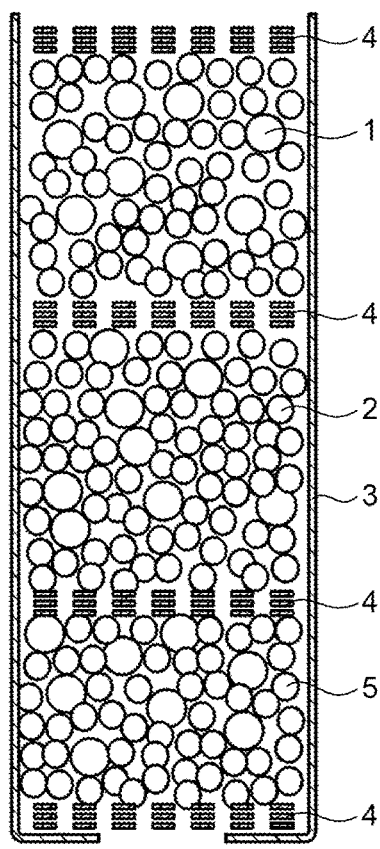
FIG. 2 is a diagram illustrating an example of structure of the second stage of the cold head of the embodiment.

An example of structure of the second stage will be described while referring to FIG. 1 and FIG. 2. FIG. 1 and FIG. 2 are diagrams each illustrating an example of structure of the second stage of the cold head.

The second stage illustrated in FIG. 1 is a stage of two-layer type, and has a regenerator material particle group 1, a regenerator material particle group 2, a regenerator container 3, and metal mesh materials 4. The second stage illustrated in FIG. 2 is a stage of three-layer type, and has a regenerator material particle group 1, a regenerator material particle group 2, a regenerator container 3, metal mesh materials 4, and a regenerator material particle group 5. As illustrated in FIG. 1 and FIG. 2, the second stage has two or more, and further, three or more of regenerator material-filled layers partitioned by the metal mesh materials 4 and having the plurality of regenerator material particle groups respectively filled therein.

In the second stage illustrated in FIG. 1, the regenerator material particle group 1 and the regenerator material particle group 2 are filled with the metal mesh materials 4 provided therebetween. The second stage is partitioned into two layers of a first regenerator material-filled layer having the regenerator material particle group 1 filled therein and a second regenerator material-filled layer having the regenerator material particle group 2 filled therein.

In the second stage illustrated in FIG. 2, the regenerator material particle group 1, the regenerator material particle group 2, and the regenerator material particle group 5 are filled with the metal mesh materials 4 provided among the groups. The second stage is partitioned into three layers of a first regenerator material-filled layer having the regenerator material particle group 1 filled therein, a second regenerator material-filled layer having the regenerator material particle group 2 filled therein, and a third regenerator material-filled layer having the regenerator material particle group 5 filled therein. As described above, the second stage may have a structure in which two or more, or three or more of regions partitioned by the metal mesh materials 4 are provided. Note that in each of FIG. 1 and FIG. 2, the structure of partitioning the second stage into two layers or three layers is exemplified, but, the present invention is not limited to this, and it is also possible to partition the second stage into four layers or more.

The metal mesh material 4 partitions the regenerator material particle group 1, the regenerator material particle group 2, and the regenerator material particle group 5. The metal mesh material 4 may also be brought into contact with at least one of the regenerator material particle group 1, the regenerator material particle group 2, and the regenerator material particle group 5, for example.

Figure 3:
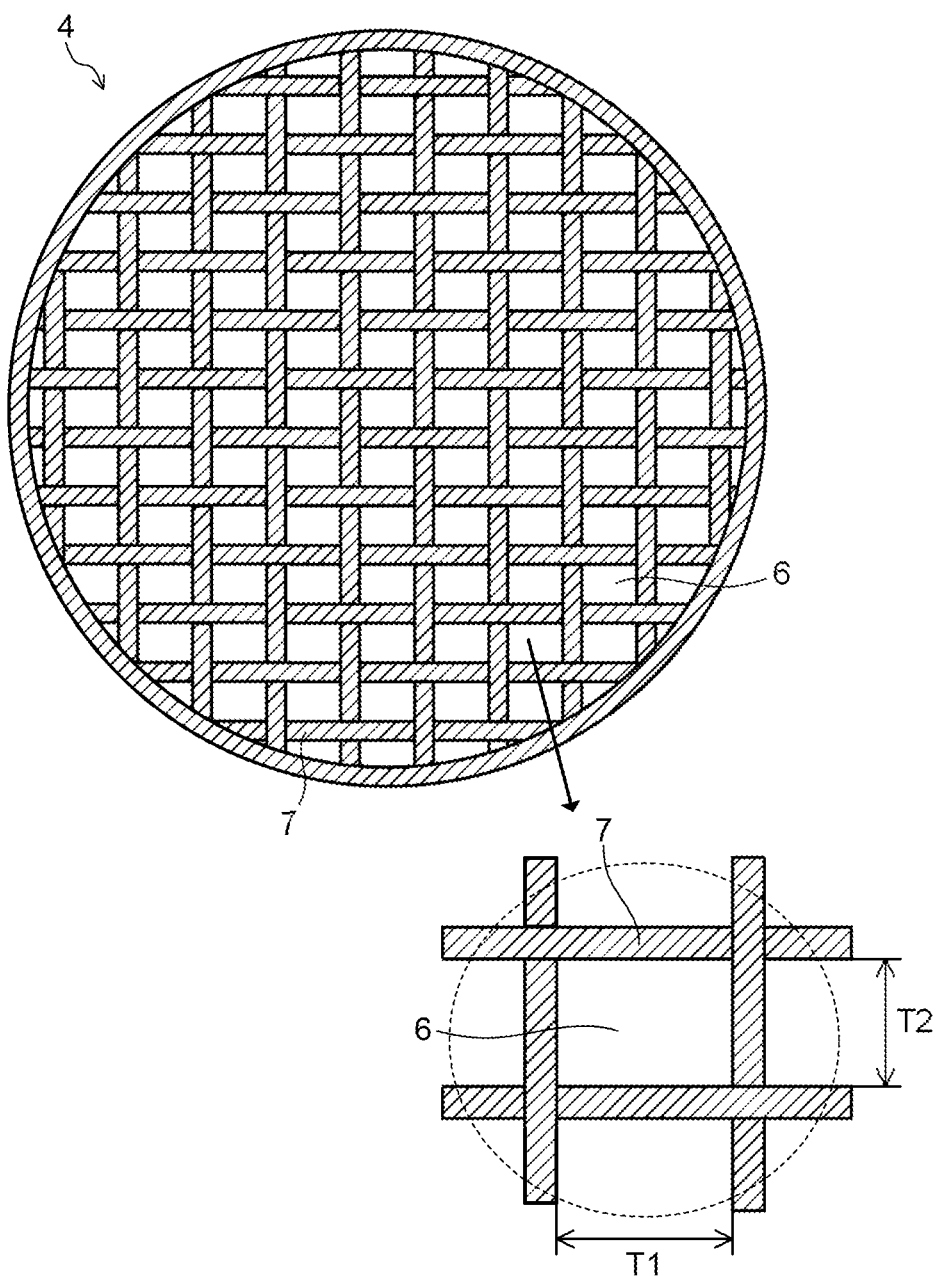
FIG. 3 is a diagram illustrating an example of structure of a metal mesh material.

An example of structure of the metal mesh material 4 will be described while referring to FIG. 3. FIG. 3 shows an example of structure of the metal mesh material 4. The metal mesh material 4 shown in FIG. 3 has mesh holes 6 and metal wires 7.

A shape of the mesh hole 6 is preferably a quadrangular shape. Here, the quadrangular shape indicates, for example, a square shape or a rectangular shape. By setting the shape of the mesh hole 6 to the quadrangular shape, when the regenerator material particle groups are filled, it is possible to form a gap in each of the mesh holes 6. This makes it possible to suppress the mesh holes 6 from being clogged with the regenerator material particle groups, so that a reduction in a permeability of refrigerant gas can be suppressed. Note that the metal mesh material 4 normally has a circular shape, as illustrated in FIG. 3. Accordingly, the mesh hole 6 at an end portion does not have to have a quadrangular shape.

When the shape of the mesh hole 6 is the quadrangular shape, a length of a long side of the mesh hole 6 is preferably ½ or less of each of average particle sizes of the regenerator material particle groups partitioned by the metal mesh material 4. For example, out of a horizontal width T1 of the mesh hole 6 and a vertical width T2 of the mesh hole 6 illustrated in FIG. 3, the longer width corresponds to the aforementioned long side.

If the length of the long side of the mesh hole 6 exceeds ½ of the average particle size of the regenerator material particle group partitioned by the metal mesh material 4, the regenerator material particle easily passes through the mesh hole 6, so that there is a possibility that different types of regenerator material particle groups are mixed, and the refrigerating capacity deteriorates. In order to form an appropriate gap in each of the mesh holes 6 when the regenerator material particle groups are filled, the length of the long side of the quadrangular mesh hole 6 is preferably ½ or less, more preferably ⅓ or less of each of the average particle sizes of the regenerator material particle groups partitioned by the metal mesh material 4. When the length of the long side is too short, the mesh hole 6 is sometimes completely blocked by the regenerator material particle. The length of the long side is preferably ¹⁄₁₀ or more of the average particle size of the regenerator material particle groups partitioned by the metal mesh material 4.

The metal wires 7 have a structure of being woven in a mesh form, for example. At this time, a region surrounded by the metal wires 7 corresponds to the mesh hole 6. Note that the structure of the metal mesh material 4 is not necessarily limited to the woven structure.

A wire diameter of the metal wire 7 is preferably not less than 20 µm nor more than 90 µm. The wire diameter of less than 20 µm becomes a main cause of increasing cost, since a strength of the metal mesh material 4 is lowered, and it becomes difficult to manufacture the metal mesh material 4. If the wire diameter exceeds 90 µm, the permeability of the refrigerant gas is lowered. The wire diameter of the metal wire 7 is preferably not less than 20 µm nor more than 90 µm, and more preferably not less than 40 µm nor more than 60 µm.

Figure 4:
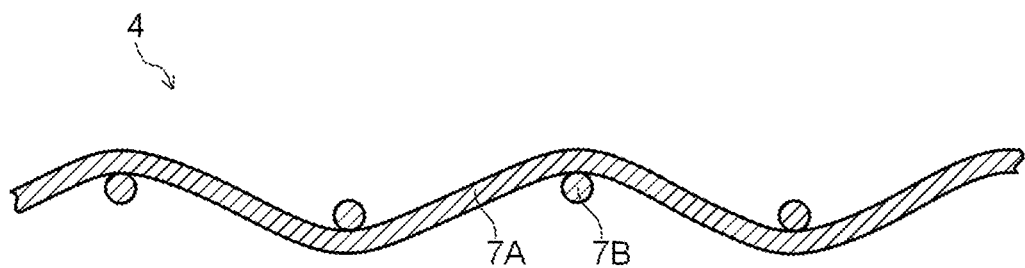
FIG. 4 is a diagram illustrating one example of a cross section of the metal mesh material.

FIG. 4 illustrates one example of a cross section of the metal mesh material 4. As illustrated in FIG. 4, by making the metal mesh material 4 have a structure in which metal wires 7B are woven with respect to a top and a bottom of the metal wire 7 in an alternate manner, the shape of the mesh hole 6 can be set to a three-dimensional shape with concave and convex. By setting the shape of the mesh hole 6 to the three-dimensional shape, it is possible to make a contact surface between the regenerator material particle group and the metal mesh material 4 to be a three-dimensional surface. The clogging of the mesh holes 6 caused by the regenerator material particles is effectively suppressed, resulting in that the reduction in the permeability of the refrigerant gas can be suppressed.

Figure 5:
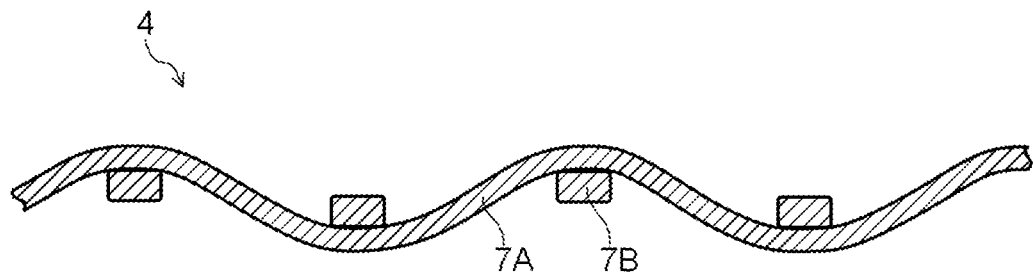
FIG. 5 is a diagram illustrating another example of the cross section of the metal mesh material.

FIG. 5 illustrates another example of the cross section of the metal mesh material 4. As illustrated in FIG. 5, it is also possible to set the shape of each of the metal wire 7A and the metal wire 7B to a flat plate shape. When the wire of the flat plate shape is used, a thicker width is set to a wire diameter. Even if the wire of the flat plate shape is employed, the wire diameter of the metal wire 7 is preferably not less than 20 µm nor more than 90 µm.

The metal mesh material 4 is preferably a copper mesh material, for example. The copper mesh material is used as the regenerator material for the first stage as described above, and even if it is provided in the second stage, it is possible to suppress an influence on the refrigerating capacity. Further, since the material has a high spring characteristic, it is difficult to be broken even if a stress is applied thereto for increasing a filling density of the regenerator material particles. Further, it is possible to mitigate a vibration during an operation of the cold head, and a vibration when the refrigerant gas is flowed. As a result of this, it is possible to suppress the breakage of the regenerator material when the cold head is operated for a long period of time.

Further, the second stage is preferably provided with a plurality of the metal mesh materials 4. At this time, the plurality of the metal mesh materials 4 are stacked. By using the stack of two or more of the metal mesh materials 4, it is possible to further increase the spring characteristic. Accordingly, a stress when filling the regenerator material particle groups is increased, resulting in that a process of increasing the filling density can be shortened. Note that when the number of the metal mesh materials 4 is too large, a space in the stage in which the regenerator material particle groups are filled becomes narrow, so that the number of the metal mesh materials 4 is preferably 5 or less.

By using the stack of the two or more of the metal mesh materials 4, it is possible to further suppress the breakage of the regenerator material when the cold head is operated for a long period of time. As a result of this, the refrigerating capacity can be maintained even if the cold head is continuously operated for 25000 hours or more, and further, 35000 hours or more.

Figure 6:
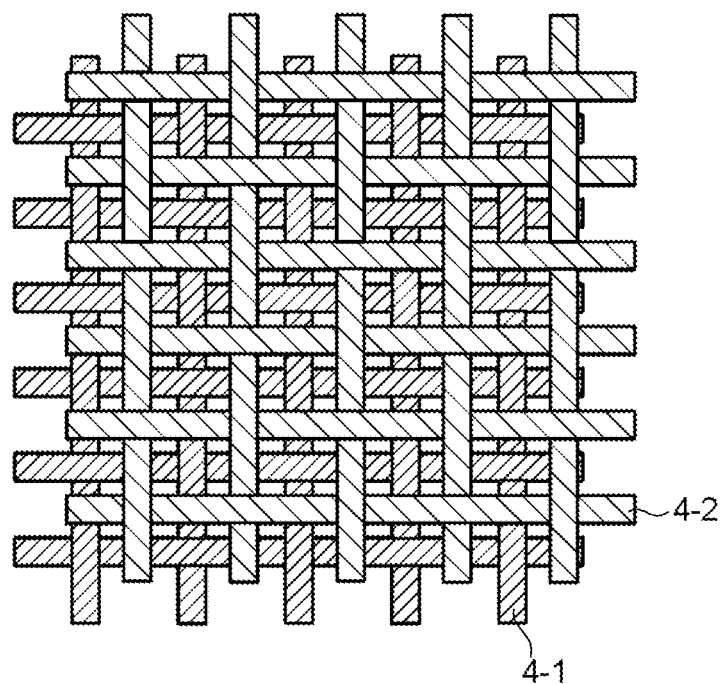
FIG. 6 is a diagram illustrating an example of structure of a stack of metal mesh materials.

The plurality of the metal mesh materials 4 are preferably stacked so that positions of the mesh holes do not match (the positions are displaced). FIG. 6 is a diagram illustrating an example of structure of a plurality of metal mesh materials. A metal mesh material 4-2 illustrated in FIG. 6 is stacked on a metal mesh material 4-1. At this time, a mesh hole of the metal mesh material 4-2 is overlapped with metal wires of the metal mesh material 4-1. As described above, by making the metal mesh material have a shape of being woven in the three-dimensional manner, it is possible to suppress the reduction in the permeability of the refrigerant gas while suppressing the clogging of the mesh holes of the metal mesh materials caused by the regenerator material particles.

In order to displace the positions of the mesh holes in the stack of the plurality of the metal mesh materials 4, it is effective to use a plurality of metal mesh materials with different shapes of mesh holes. For example, in the stack of the plurality of the metal mesh materials 4, a length of one side of the mesh hole is preferably different between or among the metal mesh materials 4. Accordingly, when the cold head is continuously operated, even if the regenerator material is broken due to a vibration during the operation and a gas pressure, the clogging of the metal mesh materials is suppressed. As a result of this, the refrigerating capacity can be maintained for a long period of time. The above is the explanation regarding the example of structure of the metal mesh material 4.

The regenerator material particle groups (the regenerator material particle group 1, the regenerator material particle group 2, and the regenerator material particle group 5) illustrated in FIG. 1 and FIG. 2 may also be regenerator material particle groups of mutually different types.

Each of the regenerator material particle groups filled in the respective regenerator material-filled layers partitioned by the metal mesh materials in the second stage, is preferably at least one selected from a lead regenerator material particle group, a holmium-copper regenerator material particle group, an erbium-nickel regenerator material particle group, an erbium-cobalt regenerator material particle group, a gadolinium oxysulfide regenerator material particle group, and a gadolinium-aluminum oxide regenerator material particle group. When a plurality of types of regenerator material particle groups are used, it is preferable to select a combination of the groups with the same specific heat peak temperature or a combination of the groups whose specific heat peak temperatures are decreased in sequence.

For example, one of the plurality of types of regenerator material particle groups can be set to the holmium-copper regenerator material particle group or the erbium-nickel regenerator material particle group. As the holmium-copper regenerator material particle group or the erbium-nickel regenerator material particle group, one excellent in a form factor R and a strength, has been developed, as disclosed in Publication of Japanese Patent No. 3769024.

The holmium-copper regenerator material particle is preferably made of, for example, $HoCu_2$ or $HoCu$. The erbium-nickel regenerator material particle is preferably made of, for example, $ErNi$ or $Er_3Ni$.

Each of average particle sizes of the regenerator material particle groups is preferably not less than 200 μm nor more than 300 μm. By setting the average particle size to not less than 200 μm nor more than 300 μm, it becomes easy to prepare regenerator material particles with high mechanical strength. Further, also when the regenerator material particle groups are filled in the second stage, it is possible to form gaps for maintaining the permeability of the refrigerant gas while increasing the filling density.

In the regenerator material particle groups, a number proportion of the regenerator material particle having a particle size which falls within a range of not less than 150 μm nor more than 350 μm, is preferably 95% or more. If it is a large number of regenerator material particles each having a particle size of less than 150 μm, this causes the clogging of the mesh holes 6 of the metal mesh material 4. Further, if it is a large number of regenerator material particles each having a particle size of greater than 350 μm, the filling density of the regenerator material is lowered, resulting in that the refrigerating capacity deteriorates. For this reason, the number proportion of the regenerator material particle having the particle size which falls within the range of not less than 150 μm nor more than 350 μm is, for example, preferably 95% or more, more preferably 98% or more, and still more preferably 100%.

A shape of the regenerator material particle configuring each of the regenerator material particle groups is preferably a spherical shape or a shape approximated to the spherical shape, in order to increase the filling density.

When a circumferential length of a projected image of the regenerator material particle configuring each of the regenerator material particle groups is set to L, and an actual area of the projected image is set to A, a proportion of the regenerator material particle in which a form factor R represented by $L^2/4\pi A$ exceeds 1.5 is preferably 5% or less. If the form factor R represented by $L^2/4\pi A$ is 1.5 or less, this means that a sphericity of the regenerator material particle is high, and a surface is smooth. Even if the particle is seemingly sphere, when a large number of very small concave and convex exist on the surface, the form factor R sometimes exceeds 1.5.

In order to perform the filling so as not to generate unnecessary gaps between the metal mesh materials 4 and the regenerator material particle groups, for example, it is preferable that a small vibration is applied to the regenerator container to fill the regenerator material particles so that the gap between the regenerator material particles becomes small, and thereafter, the metal mesh materials 4 are pressed against the particles while applying a stress, and the materials are fixed. As described above, in order to efficiently fill the regenerator material particle groups, it is effective to apply the vibration and the stress.

When the vibration and the stress are applied to the regenerator material particles, it is required that the regenerator material particle has a high mechanical strength. As one of methods of improving the mechanical strength of the regenerator material particle, there can be cited a method of making the form factor R to be 1.5 or less. By eliminating the very small concave and convex on the surface, it is possible to improve the mechanical strength. A proportion of the regenerator material particle whose form factor R exceeds 1.5 is preferably 5% or less, more preferably 2% or less, and still more preferably 0%. Further, the form factor R of each of the regenerator material particles is preferably 1.2 or less.

By reducing the form factor R of each of the regenerator material particles, the mechanical strength of the regenerator material particles is increased, and it is possible to fill the regenerator material particles so as not to generate the unnecessary gaps between the particles and the metal mesh materials 4, resulting in that the refrigerating capacity can be improved.

When the plurality of types of regenerator material particle groups are used, in at least one regenerator material particle group, a proportion of particle having the form factor R of 1.5 or less is preferably 5% or less. In particular, it is preferable that the regenerator material particle group to be arranged on a lower side in the second stage satisfies the above-described proportion. This is because when the regenerator material particle groups are filled in the second stage, the regenerator material particle group to be arranged on the lower side is firstly filled, and thus the regenerator material particle group to be arranged on the lower side receives greater vibration and stress, when compared to a vibration and a stress with respect to the regenerator material particle group to be arranged on an upper side. Note that when the plurality of types of regenerator material particle groups are used, it is more preferable that a proportion of particle having the form factor R of 1.5 or less is 5% or less in all of the regenerator material particle groups.

In the regenerator material particle groups, it is possible to separately conduct the control of the particle size and the control of the form factor R described above, it is preferable to conduct both of the controls in a combined manner.

In the cold head of the present embodiment, the shape of the mesh hole of the metal mesh material is adjusted. This makes it possible to suppress the clogging of the mesh holes caused by the regenerator material particle groups, so that the reduction in the permeability of the refrigerant gas is suppressed. For this reason, it is possible to fill the plurality of types of regenerator material particle groups in the stage of the cold head to improve the refrigerating capacity. Therefore, a reliability of a superconducting magnet, various types of apparatus such as an examination apparatus and a cryopump each including the cold head of the present embodiment, is improved.

As the examination apparatus, an MRI apparatus, an NMR apparatus and the like can be cited. For example, the MRI apparatus is a medical equipment which can take a photograph of human body in vertical and horizontal directions by utilizing a magnetism. Presently, the MRI apparatus can obtain a clear image at a level of equal to or greater than that of an X-ray Computed Tomography (CT) apparatus, and is used for angiography, and for photographing to check the presence/absence of aneurism in the brain or brain tumor.

The photographing in the MRI apparatus is conducted not only in a routine checkup but also in an emergency medical examination, as a matter of course. For this reason, there is a need to make the MRI apparatus to be constantly operated so that it is possible to perform photographing at any time. In order to make the MRI apparatus to be constantly operated, it is required to make a superconducting magnet for obtaining the cryogenic temperature and a cold head including the superconducting magnet to be in an operation state. In the cold head of the present embodiment, the filling density of the regenerator material particles is improved, and in addition to that, the reduction in the permeability of the refrigerant gas is suppressed. Accordingly, the refrigerating capacity possessed by the regenerator material particles can be maintained over a long period. Therefore, it is possible to obtain a long-term reliability of not only the cold head but also the superconducting magnet, and the various types of apparatus such as the examination apparatus and the cryopump each including the cold head.

EXAMPLES

Example 1 to Example 10, Comparative example 1

Samples including regenerator material particles presented in Table 1 were prepared as regenerator material particle groups. Note that in Table 1, a Pb particle indicates a lead regenerator material particle. A $HoCu_2$ particle indicates a holmium-copper regenerator material particle. An $Er_3Ni$ particle indicates an erbium-nickel regenerator material particle. A GOS particle indicates a gadolinium oxysulfide regenerator material particle. A GAP particle indicates a gadolinium-aluminum oxide regenerator material particle. A HoCu particle indicates a holmium-copper regenerator material particle. An $Er_3Co$ particle indicates an erbium-cobalt regenerator material particle. Further, the control of the form factor R and the control of the particle size are conducted by a classification based on form.

TABLE 1

| Sample of Regenerator Material | Regenerator Material Particle Group | Form Factor R | | | Average Particle Size (μm) | Number Proportion of Particle Having Particle Size of 150 μm to 350 μm (%) |
| | | Number Proportion Satisfying R > 1.5 (%) | Number Proportion Satisfying 1.5 ≥ R > 1.2 (%) | Number Proportion Satisfying 1.2 ≥ R (%) | | |
| --- | --- | --- | --- | --- | --- | --- |
| Sample 1 | Pb Particle | 0 | 4 | 96 | 250 | 100 |
| Sample 2 | $HoCu_2$ Particle | 1 | 2 | 97 | 200 | 98 |
| Sample 3 | $HoCu_2$ Particle | 0 | 0 | 100 | 260 | 100 |
| Sample 4 | $HoCu_2$ Particle | 10 | 20 | 70 | 380 | 70 |
| Sample 5 | $Er_3Ni$ Particle | 2 | 1 | 97 | 270 | 98 |
| Sample 6 | GOS Particle | 0 | 0 | 100 | 240 | 100 |
| Sample 7 | GAP Particle | 2 | 3 | 95 | 250 | 98 |
| Sample 8 | HoCu Particle | 1 | 5 | 94 | 240 | 100 |
| Sample 9 | $Er_3Co$ Particle | 3 | 7 | 90 | 270 | 100 |

Next, samples of copper mesh materials presented in Table 2 were prepared as metal mesh materials. Note that "presence" of woven structure indicates a sample of metal mesh material formed by weaving copper wires, and "absence" of woven structure indicates a sample of metal mesh material formed by performing etching on a metal plate made of copper.

TABLE 2

| Copper Mesh Material | Mesh Hole Shape | T1 (μm) | T2 (μm) | Wire Diameter of Copper Wire (μm) | Woven Structure |
|---|---|---|---|---|---|
| Sample A | Rectangular Shape | 120 | 100 | 100 | Absence |
| Sample B | Square Shape | 100 | 100 | 85 | Presence |
| Sample C | Square Shape | 70 | 70 | 50 | Presence |
| Sample D | Square Shape | 40 | 40 | 30 | Presence |
| Sample E | Circular Shape | Diameter: 100 | | 70 | Absence |

Next, the samples of the regenerator material particle groups (the sample 1 to the sample 9) and the samples of the metal mesh materials (the sample A to the sample E) were combined as presented in Table 3, to thereby create a two-layer structure or a three-layer structure in a second stage of each of cold heads. At this time, the regenerator material particle groups were filled while applying a vibration so that the filling factor became as high as possible. Between the respective regenerator material particle groups, three of the samples of the metal mesh materials were stacked to be arranged.

The permeability of the refrigerant gas was examined regarding the respective examples and the comparative example. In the examination of the permeability of the refrigerant gas, when a quantity of flowed gas in the comparative example 1 was set to 100, a cold head in which a quantity of flowed gas was 120 or more and less than 141 were indicated by "moderate", and a cold head in which a quantity of flowed gas was 141 or more were indicated by "good". Results thereof are presented in Table 3.

TABLE 3

| | First Regenerator Material Particle Group | Second Regenerator Material Particle Group | Third Regenerator Material Particle Group | Metal Mesh Material | Filling Factor (%) | Permeability |
|---|---|---|---|---|---|---|
| Example 1 | Sample 1 | Sample 2 | — | Sample A | 62 | Moderate |
| Example 2 | Sample 1 | Sample 3 | — | Sample B | 62 | Good |
| Example 3 | Sample 1 | Sample 3 | Sample 6 | Sample C | 63 | Good |
| Example 4 | Sample 1 | Sample 3 | Sample 7 | Sample D | 62 | Good |
| Example 5 | Sample 2 | Sample 4 | — | Sample B | 55 | Moderate |
| Example 6 | Sample 3 | Sample 5 | — | Sample C | 63 | Good |
| Example 7 | Sample 3 | Sample 6 | — | Sample D | 63 | Good |
| Example 8 | Sample 1 | Sample 3 | Sample 3 | Sample B | 62 | Good |
| Example 9 | Sample 8 | Sample 3 | Sample 6 | Sample C | 62 | Good |
| Example 10 | Sample 8 | Sample 9 | Sample 6 | Sample C | 62 | Good |
| Comp. Exam 1 | Sample 1 | Sample 2 | — | Sample E | 62 | — |

It was confirmed that the permeability of the refrigerant gas was high in the cold head related to each of the example 1 to the example 10. The permeability of the refrigerant gas was high in each of the example 2 to the example 4, and each of the example 6 to the example 8, in particular. As described above, the reduction in the permeability of the refrigerant gas is suppressed by optimizing the shape of the regenerator material particle and the shape of the mesh hole of the metal mesh material. For this reason, it is possible to improve the refrigerating capacity of the cold head by making the best use of the performance of the regenerator material.

Example 11 to Example 13

The regenerator material particles in a combination same as that of the example 3 (the sample 1, the sample 3, and the sample 6) were prepared. Next, three types of the sample B to the sample D were prepared as the metal mesh materials, and by stacking the materials as presented in Table 4, cold heads related to the example 11 to the example 13 were formed.

Regarding the cold heads related to the example 3, and the example 11 to the example 13, a maintenance ratio of the refrigerating capacity after the cold heads were continuously operated was examined. Regarding the maintenance ratio of the refrigerating capacity, each of the refrigerating capacity (W) after the elapse of time of 20000 hours, that after the elapse of time of 30000 hours, and that after the elapse of time of 40000 hours, was indicated by a ratio when the refrigerating capacity (W) as an initial value was set to 100. Note that as the cold head of each of the examples, a GM type cold head having the refrigerating capacity of 0.5 W under 4.2 K, was used.

TABLE 4

| | | Refrigerating Capacity | | | |
|---|---|---|---|---|---|
| | Metal Mesh Material | Initial Value | After 20000 Hours | After 30000 Hours | After 40000 Hours |
| Example 3 | Sample C × 3 | 100 | 94 | 90 | 85 |
| Example 11 | Sample B + Sample C | 100 | 95 | 92 | 89 |
| Example 12 | Sample B × 2 + Sample C | 100 | 96 | 93 | 90 |
| Example 13 | Sample B + Sample C + Sample D | 100 | 96 | 93 | 90 |

As can be understood from FIG. 4, the cold head related to each of the example 11 to the example 13 had a high maintenance ratio of the refrigerating capacity even after the elapse of time of 20000 hours, 30000 hours, and 40000 hours. This indicates that even if the regenerator material is broken by the vibration, the clogging of the metal mesh materials is difficult to occur.

The maintenance ratio of the refrigerating capacity was high in the cold head in which the metal mesh materials with different sizes of mesh holes were stacked, as in the example 11 to the example 13. This indicates that in the metal mesh materials woven in the three-dimensional manner, positions of the mesh holes of the overlapped metal mesh materials are displaced so that the clogging of the metal mesh materials is suppressed.

Further, regarding cases where the example 3, and the example 11 to the example 13 were employed for pulse type cold heads (having a refrigerating capacity of 0.5 W under 4.2 K), the maintenance ratio of the refrigerating capacity after the cold heads were continuously operated was examined. Results thereof are presented in Table 5.

TABLE 5

| | | Refrigerating Capacity | | | |
|---|---|---|---|---|---|
| | Metal Mesh Material | Initial Value | After 20000 Hours | After 30000 Hours | After 40000 Hours |
| Example 3 | Sample C × 3 | 100 | 96 | 93 | 90 |
| Example 11 | Sample B + Sample C | 100 | 98 | 96 | 92 |
| Example 12 | Sample B × 2 + Sample C | 100 | 98 | 97 | 95 |
| Example 13 | Sample B + Sample C + Sample D | 100 | 98 | 97 | 95 |

From FIG. 5, it was confirmed that excellent characteristics were obtained also when the pulse type cold heads were used. This indicates that even if the regenerator material is broken by the vibration, the clogging of the metal mesh materials is difficult to occur. Note that when the GM type and the pulse type were compared, the deterioration rate of the refrigerating capacity in the pulse type was lower than that of the GM type, since the vibration was smaller in the pulse type than that in the GM type.

Note that the above-described embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for manufacturing a cold head, comprising:
preparing a regenerator container;
filling a first regenerator material particle group having an average particle size in a range from 200 μm to 380 μm in the regenerator container;
filling a plurality of metal mesh materials on the first regenerator material particle group in the regenerator container; and
filling a second regenerator material particle group having an average particle size in a range from 200 μm to 380 μm on the plurality of metal mesh materials in the regenerator container so that the second regenerator material particle group is partitioned with the first regenerator material particle group by the plurality of metal mesh materials,
wherein each of the plurality of metal mesh materials has quadrangular mesh holes each having a length of a long side in a range from 1/10 to 1/2 of each of the average particle sizes of the first and second regenerator material particle groups,
wherein each of the plurality of metal mesh materials has metal wires woven in a mesh form, and each of the metal wires has a wire diameter in a range from 20 μm to 90 μm,
wherein the plurality of metal mesh materials are stacked so that positions of the mesh holes in the plurality of the metal mesh materials do not match, and
wherein a length of one side of each of the mesh holes in one of the plurality of metal mesh materials is different from a length of one side of each of the mesh holes in another one of the plurality of the metal mesh materials.

2. The method according to claim 1,
wherein one of the plurality of metal mesh materials comprises a copper mesh material.

3. The method according to claim 1,
wherein the second regenerator material particle group has a different kind of material with the first regenerator material particle group.

4. The method according to claim 1,
wherein each of the first and second regenerator material particle groups is at least one selected from the group consisting of a lead regenerator material particle group, a holmium-copper regenerator material particle group, an erbium-nickel regenerator material particle group, an erbium-cobalt regenerator material particle group, a gadolinium oxysulfide regenerator material particle group, and a gadolinium-aluminum oxide regenerator material particle group.

5. The method according to claim 1, further comprising:
filling a plurality of metal mesh materials on the second regenerator material particle group in the regenerator container; and
filling a third regenerator material particle group having an average particle size in a range from 200 μm to 380 μm on the plurality of metal mesh materials in the regenerator container so that the third regenerator material particle group is partitioned with the second regenerator material particle group by the plurality of metal mesh materials.

6. The method according to claim 1,
wherein a proportion of particle in which a form factor R represented by $L^2/4\pi A$ exceeds 1.5 is 5% or less in each of the first and second regenerator material particle groups, where L is a circumferential length of a projected image of the regenerator material particle, and A is an actual area of the projected image.

7. The method according to claim 1,
wherein each of the average particle sizes of the first and second regenerator material particle groups is 200 μm or more and 300 μm or less; and
wherein a number proportion of particle having a particle size which falls within a range of 150 μm or more and 350 μm or less is 95% or more in each of the first and second regenerator material particle groups.

8. The method according to claim 1,
wherein the cold head is configured to achieve a temperature of 10 K or less.

9. The method according to claim 1,
wherein the cold head is configured to achieve a temperature of 5 K or less.

10. The method according to claim 1,
wherein the cold head is a GM type cold head.

11. The method according to claim 1,
wherein the cold head is a pulse type cold head.

12. The method according to claim 1,
wherein the cold head is a Stirling type cold head.

13. The method according to claim 1,
wherein the cold head is used for a superconducting magnet, an examination apparatus, or a cryopump.

14. The method according to claim 13,
wherein the examination apparatus is a magnetic resonance imaging apparatus or a nuclear magnetic resonance apparatus.

* * * * *